(12) United States Patent
Song et al.

(10) Patent No.: US 11,662,454 B2
(45) Date of Patent: May 30, 2023

(54) SYSTEMS AND METHODS FOR RANGE-RATE DEALIASING USING POSITION CONSISTENCY

(71) Applicant: Ford Global Technologies, LLC, Dearborn, MI (US)

(72) Inventors: Xiufeng Song, San Jose, CA (US); Avinash Ajit Nargund, San Jose, CA (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 17/086,559

(22) Filed: Nov. 2, 2020

(65) Prior Publication Data

US 2022/0137202 A1    May 5, 2022

(51) Int. Cl.
  *G01S 13/58*  (2006.01)
  *G01S 13/44*  (2006.01)
  *G01S 7/10*  (2006.01)

(52) U.S. Cl.
  CPC .............. *G01S 13/583* (2013.01); *G01S 7/10* (2013.01); *G01S 13/449* (2013.01)

(58) Field of Classification Search
  CPC ....................................................... G01S 7/295
  See application file for complete search history.

(56) References Cited

U.S. PATENT DOCUMENTS

| | | | | |
|---|---|---|---|---|
| 5,247,303 A | * | 9/1993 | Cornelius | ................ G01S 7/417 342/84 |
| 2007/0164897 A1 | | 7/2007 | Leskiw | |
| 2013/0242284 A1 | | 9/2013 | Zeng | |
| 2014/0072220 A1 | | 3/2014 | Goodman et al. | |
| 2015/0363940 A1 | * | 12/2015 | Held | ....................... G06T 7/207 382/107 |
| 2017/0178357 A1 | | 6/2017 | Yang et al. | |
| 2018/0108146 A1 | | 4/2018 | Zhan et al. | |

(Continued)

FOREIGN PATENT DOCUMENTS

| | | | | |
|---|---|---|---|---|
| CN | 105137410 A | * | 12/2015 | ........... G01S 13/958 |
| CN | 108535730 B | * | 9/2020 | ........... G01S 13/958 |
| WO | 2022012158 A1 | | 1/2022 | |

OTHER PUBLICATIONS

He G, Sun J, Ying Z, Zhang L. A Radar Radial Velocity Dealiasing Algorithm for Radar Data Assimilation and its Evaluation with Observations from Multiple Radar Networks. Remote Sensing. 2019; 11(20):2457. https://doi.org/10.3390/rs11202457 (Year: 2019).*
Shuyuan, et al., "A Simple Algorithm for Eliminating Doppler Velocity Aliasing," Department of Atmospheric Science, Peking University, Beijing, China, pp. 1-4.

(Continued)

*Primary Examiner* — Erin F Heard
*Assistant Examiner* — Hailey R Le
(74) *Attorney, Agent, or Firm* — Frank MacKenzie; Brooks Kushman, P.C.

(57) ABSTRACT

Systems and methods for operating radar systems. The methods comprise, by a processor: receiving point cloud information generated by at least one radar device and a spatial description for an object; generating a plurality of point cloud segments by grouping data points of the point cloud information based on the spatial description; arranging the point cloud segments in a temporal order to define a radar tentative track; performing dealiasing operations using the radar tentative track to generate tracker initialization information; and using the tracker initialization information to generate a track for the object.

33 Claims, 10 Drawing Sheets

(56) References Cited

U.S. PATENT DOCUMENTS

| | | | |
|---|---|---|---|
| 2018/0335787 A1 | 11/2018 | Zeng et al. | |
| 2018/0356498 A1* | 12/2018 | Stachnik | G01S 13/42 |
| 2019/0011547 A1* | 1/2019 | Han | G01S 13/30 |
| 2019/0302259 A1 | 10/2019 | Van Fleet et al. | |
| 2019/0391249 A1 | 12/2019 | Takeuchi et al. | |
| 2020/0003869 A1* | 1/2020 | Yang | G01S 17/89 |
| 2020/0132850 A1 | 4/2020 | Crouch et al. | |
| 2020/0209352 A1* | 7/2020 | Rao | G01S 13/343 |
| 2020/0249315 A1* | 8/2020 | Eshet | G01S 13/343 |
| 2020/0400821 A1* | 12/2020 | Baker | G01S 17/58 |
| 2022/0058818 A1* | 2/2022 | Qi | G06K 9/6271 |

OTHER PUBLICATIONS

Xu, et al., "A VAD-Based Dealiasing Method for Radar Velocity Data Quality Control," Journal of Atmospheric and Oceanic Technology, vol. 28, Jan. 2011, pp. 50-62.

Song, et al., "Range Bias Modeling for Hyperbolic-Frequency-Modulated Waveforms in Target Tracking," IEEE Journal of Oceanic Engineering, vol. 37, No. 4, Oct. 2012, pp. 670-679.

Shuyuan, et al., "A Simple Algorithm for Eliminating Doppler Velocity Aliasing," Department of Atmospheric Science, Peking University, Beijing, China, pp. 1-4, Aug. 2003.

He, et al., "A Radar Radial Velocity Dealiasing Algorithm for Radar Data Assimilation and its Evaluation with Observations from Multiple Radar Networks," Remote Sens. 2019, 11, 2457, doi:10.3990/rs11202457, pp. 1-16.

U.S. Appl. No. 17/016,558, filed Sep. 10, 2020, Systems and Methods for Simultaneous Range-Rate Unwrapping and Outlier Removal for Radar.

* cited by examiner

SYSTEMS AND METHODS FOR RANGE-RATE DEALIASING USING POSITION CONSISTENCY

BACKGROUND

Statement of the Technical Field

The present disclosure relates generally to radar systems. More particularly, the present disclosure relates to implementing systems and methods for range-rate dealiasing using position consistency.

Description of the Related Art

Radar systems are often used for detecting the presence, direction, distance and speed of objects. The objects can include vehicles, ships, aircrafts, pedestrians, animals, trees and/or buildings. During operations, a radar system emits a signal that is reflected off of an object back towards the radar systems. The reflected signal is received by the radar system. The received signal provides information about the object's location and speed. For example, if an object is moving either toward or away from the radar system, the received signal will have a slightly different frequency than the frequency of the emitted signal due to the Doppler effect.

SUMMARY

The present disclosure concerns implementing systems and methods for operating a radar system. The methods comprise performing the following operations by a processor: receiving point cloud information generated by at least one radar device and a spatial description for an object; generating a plurality of point cloud segments by grouping data points of the point cloud information based on the spatial description; arranging the point cloud segments in a temporal order to define a radar tentative track; performing dealiasing operations using the radar tentative track to generate tracker initialization information; and using the tracker initialization information to generate a track for the object.

In some scenarios, a single data point can form a point cloud segment if it is away from any to the data point. In other scenarios, at least two data points are grouped together to form a point cloud segment when: a Euclidean distance between the two data points is less than a threshold value; an absolute difference between range-rate angles of the two data points is less than a threshold value; and/or a difference between range-rate amplitudes of the two data points is less than a threshold value.

In those or other scenarios, the dealiasing operations comprise: computing an average range-rate value and an average velocity ambiguity value for each point cloud segment and the radar tentative track; computing a range-rate difference value between the average range-rate value for a given point cloud segment and the average range-rate value for the radar tentative track; comparing the range-rate difference value to a threshold value; determining that the range-rate difference value is close to the average velocity ambiguity for the radar tentative track when the range-rate difference is greater than the threshold value; and/or determining that an edge case exists when a determination is made that the range-rate difference value is close to the average velocity ambiguity for the radar tentative track.

In those or other scenarios, the dealiasing operations comprise performing a position consistency dealiasing algorithm. The position consistency dealiasing algorithm involves estimating an average range-rate in accordance with mathematical equation $$RR_{estimate} = (P_t - P_s)/(TV_{average-T} - TV_{average-S})$$

where $RR_{estimate}$ is an estimated average range-rate, $P_t$ is a position of the radar tentative track, $P_s$ is a position of a given point cloud segment, $TV_{average-T}$ is an average time of validity for the radar tentative track, and $TV_{average-S}$ is an average time of validity for the given point cloud segment.

The position consistency dealiasing algorithm also involves determining a plurality of possible K values in accordance with mathematical equation $$|RR_{measured} + K \cdot B_{average-S}| \le v_g$$

where $RR_{measured}$ is a measured range rate for a given data point, $B_{average-S}$ is an average velocity ambiguity for a given point cloud segment, and $v_g$ is a rational maximum speed over ground. K is an integer (positive, negative or zero).

The possible K values are then used to generate a plurality of range-rate hypotheses values in accordance with mathematical equation $$RR_{hypothesis} = RR_{average-T} + K \cdot B_{average-S}$$

where $RR_{hypothesis}$ is a range-rate hypotheses value, and $RR_{average-T}$ is an average range-rate for the radar tentative track. A hypothesis is accepted when a respective one of the plurality of range-rate hypotheses values is less than a pre-defined threshold. When an hypothesis is accepted, an absolute difference is determined between the estimated average range-rate and a given range-rate hypothesis value of the plurality of range-rate hypotheses values. The position consistency dealiasing algorithm is considered successful when the absolute difference is greater than a threshold. A true range-rate value is determined when the position consistency dealiasing algorithm is considered successful. The true range-rate is used to generate the tracker initialization information.

BRIEF DESCRIPTION OF THE DRAWINGS

The present solution will be described with reference to the following drawing figures, in which like numerals represent like items throughout the figures.

DETAILED DESCRIPTION

Figure 1:
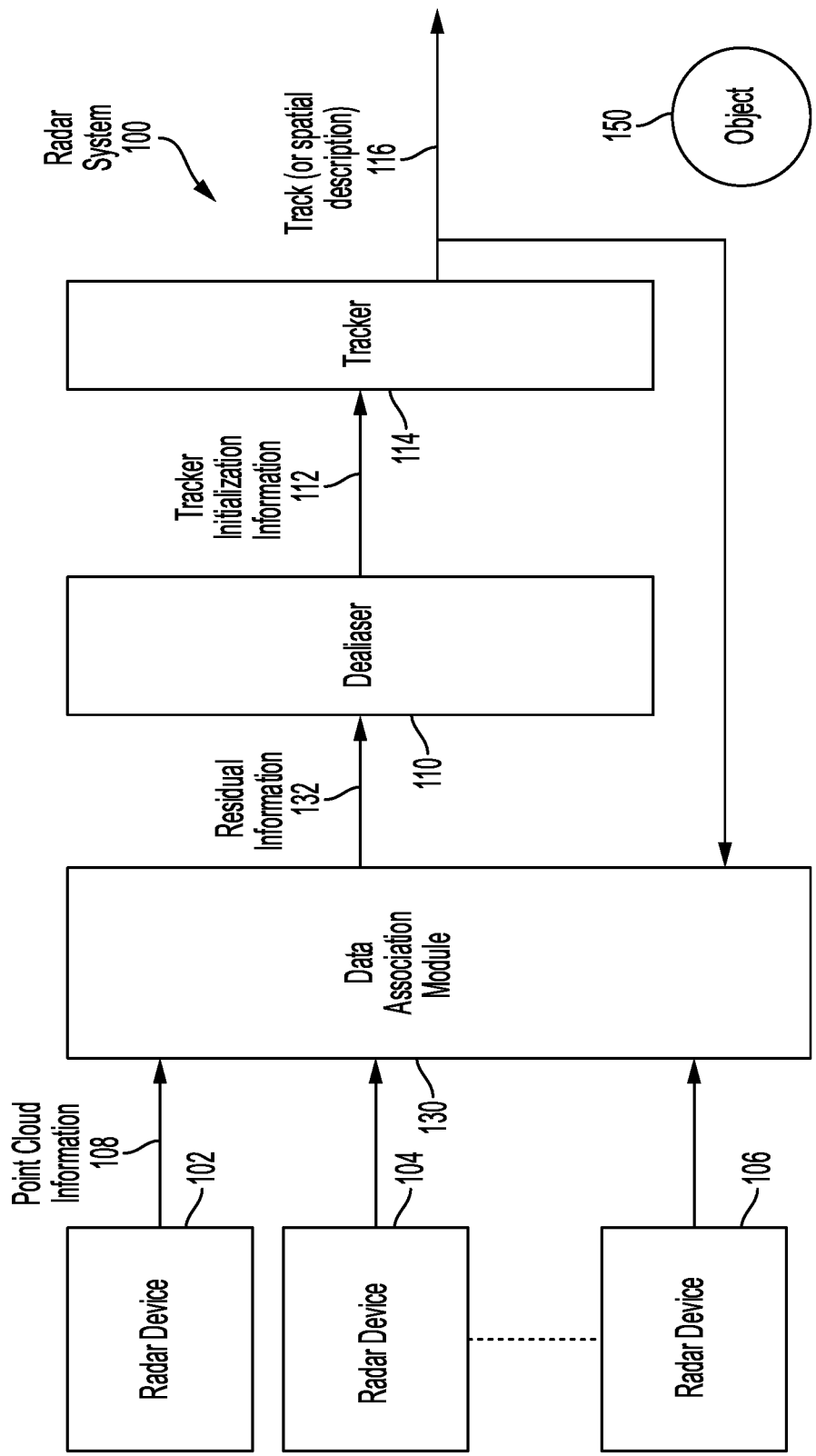
FIG. 1 provides an illustration of an illustrative radar system.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or a human operator may override the vehicle's autonomous system and may take control of the vehicle, or it may be a human-operated vehicle equipped with an advanced driver assistance system.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

The terms "track" and "radar track" generally refer to a spatial description that identifies an object by its kinematics and/or classification attributes. A track and radar track may include, without limitation, a location (e.g., an x-coordinate, a y-coordinate and/or a z-coordinate), a range-rate, and a velocity (e.g., speed plus a direction of travel) for each data point of a point cloud that is associated with the object. Techniques for generating tracks may include, without limitation, using a track. The track filter can include, but is not limited to, a Kalman filter, an extended Kalman filter, an unscented Kalman filter, and/or a particle filter.

The terms "tracker initializer" and "initializer" generally refer to one or more values that are used to initialize an algorithm for generating a track or radar track. For example, the radar track initializer can include one or more initialization input values for a track filter. The track filter may be initialized on the first detection of an object. The detection produces point cloud information which includes for each data point, without limitation, an x-coordinate, a y-coordinate, a covariance metric of x and y, a range, a velocity in the x-direction, a velocity in the y-direction, a covariance metric of the velocity in the x-direction, a covariance of the velocity in the y-direction, and/or an azimuth measurement for a detected object. One or more of these listed values may be used as input values to initialize the track filter. As such, a radar track initializer can include, but is not limited to, an x-coordinate, a y-coordinate, a covariance metric of x and y, a range, a velocity in the x-direction, a velocity in the y-direction, a covariance metric of the velocity in the x-direction, a covariance of the velocity in the y-direction, and/or an azimuth measurement for a detected object.

The present concerns implementing systems and methods for range-rate dealiasing. The methods generally involve: obtaining a spatial description for a cycle (e.g., a location (i.e., x-coordinate, y-coordinate), a velocity (i.e., speed plus direction of travel), a velocity ambiguity B, a range-rate RR, range-rate angles, etc. for a plurality of data points); optionally accumulate N spatial descriptions (e.g., spatial description for cycle c1, spatial description for cycle c2, etc.); arranging data points into point cloud segments $S_n$ based on x-coordinates, y-coordinates and range-rates; sequentially organizing the point cloud segments based on time information to define a radar tentative track $T_{tentitive}$; performing radar tentative track segment dealiasing to produce a true range-rate $RR_{true}$; using the true range-rate $RR_{true}$ to generate a tracker initializer; providing the tracker initializer to a tracker to generate a radar track defining a spatial description for a given cycle; and providing the spatial description to the dealiaser for use in a next iteration of range-rate dealiasing.

The radar tentative track segment dealiasing generally involves: computing an average range-rate (e.g., 35.1 or 5.1) and an average velocity ambiguity for a given point cloud segment $S_n$ (e.g., 30); computing an average range-rate (e.g., 35) and an average velocity ambiguity from the radar tentative track $T_{tentitive}$ (e.g., 30); computing a difference (e.g., 35-35.1=0.1 or 35-5.1=29.9) between the average range-rate of the point cloud segment $S_n$ and the average range-rate of the radar tentative track $T_{tentitive}$; comparing the difference (e.g., 0.1 or 29.9) to a threshold value (e.g., 1 or 2); setting a first flag indicating that an edge case is true when the difference is greater than the threshold (e.g., 29.9>1 or 2) and the difference is close to the average velocity ambiguity (e.g., 29.9 is close to 30) (otherwise set a second flag indicating that position consistency cannot be used); performing a position consistency algorithm when the difference is less than the threshold (e.g., 0.1<1 or 2); and computing a true range-rate $RR_{true}$ for each data point in the segment ($RR=RR_{true}+K*B$), when the first flag indicates that the edge case is true and the position consistency algorithm was successful.

The above-described dealiasing approach has certain advantages as compared to those of the prior art dialiasing algorithms. For example, the present solution provides more accurate range-rates for far-range detections.

Illustrative Radar Systems

The present solution concerns a radar system for detecting the presence, direction, distance and speed of objects, which may include moving actors, stationary objects, or both. The objects can include vehicles, ships, aircrafts, pedestrians, animals, trees and/or buildings. An illustration of an illustrative radar system 100 is provided in FIG. 1. As shown in FIG. 1, the radar system 100 comprises a plurality of radar devices 102, 104, 106. Although three radar devices are shown in FIG. 1. The present solution is not limited in this regard. The radar system can include any number of radar devices selected in accordance with a given application. An illustrative architecture for a radar device will be discussed below in relation to FIG. 2. The radar system 100 also comprises a data association module 130, a dealiaser 110 and a tracker 114. The data association module 130, dealiaser 110 and/or tracker 114 can include, but is(are) not limited to, a computing device such as that shown in FIG. 9.

During operation, each radar device 102, 104, 106 emits a signal that is reflected off of an object 150 back towards the radar device. The reflected signal is received by the radar device 102, 104, 106. The received signal provides information about the object's location and speed. For example, if the object 150 is moving either toward or away from the radar system 100, the received signal will have a slightly different frequency than the frequency of the emitted signal due to the Doppler effect. The radar device processes the received signal and generates a point cloud including a plurality of data points. Point clouds are well known in the art. Point cloud information 108 is communicated from the radar device to the data association module 130. The point cloud information 108 includes, but is not limited to, a signal strength, a range value, a range-rate value, a range-rate angle value, a range-rate amplitude value, an velocity ambiguity, and/or a moduli for each point in the cloud. The range-rate value indicates a rate that the object 150 moves toward or away from the radar system 100. For example, a negative range-rate value indicates that the object 150 is moving away from the radar system 100 at a certain velocity, while a positive range-rate value indicates that the object 150 is moving towards the radar system 100 at a certain velocity. The present solution is not limited to the particulars of this example.

The data association module 130 and dealiaser 110 collectively perform operations to address errors in the range-rate values of the point cloud information output from the radar devices 102, 104, 106. The operations performed by components 130, 110 will become evident as the discussion progresses. These operations produce tracker initializer information 112. The tracker initializer information 112 includes, but is not limited to, the following information for each point in the cloud: a signal strength; a range value; an original range-rate value or a corrected range-rate value; a range-rate angle value; and a moduli. The tracker initializer information 112 is then passed to the tracker 114.

At the tracker 114, the tracker initializer information 112 is used to generate a track (or spatial description) 116 for the object 150. The track (or spatial description) 116 includes, but is not limited to, a location (e.g., an x-coordinate and a y-coordinate), a range-rate, and a velocity (i.e., speed plus a direction of travel) for each data point of the point cloud that is associated with the object. Techniques for generating tracks (or spatial descriptions) are well known. In some scenarios, a Kalman filter is used to generate the track (or spatial description).

Figure 2:
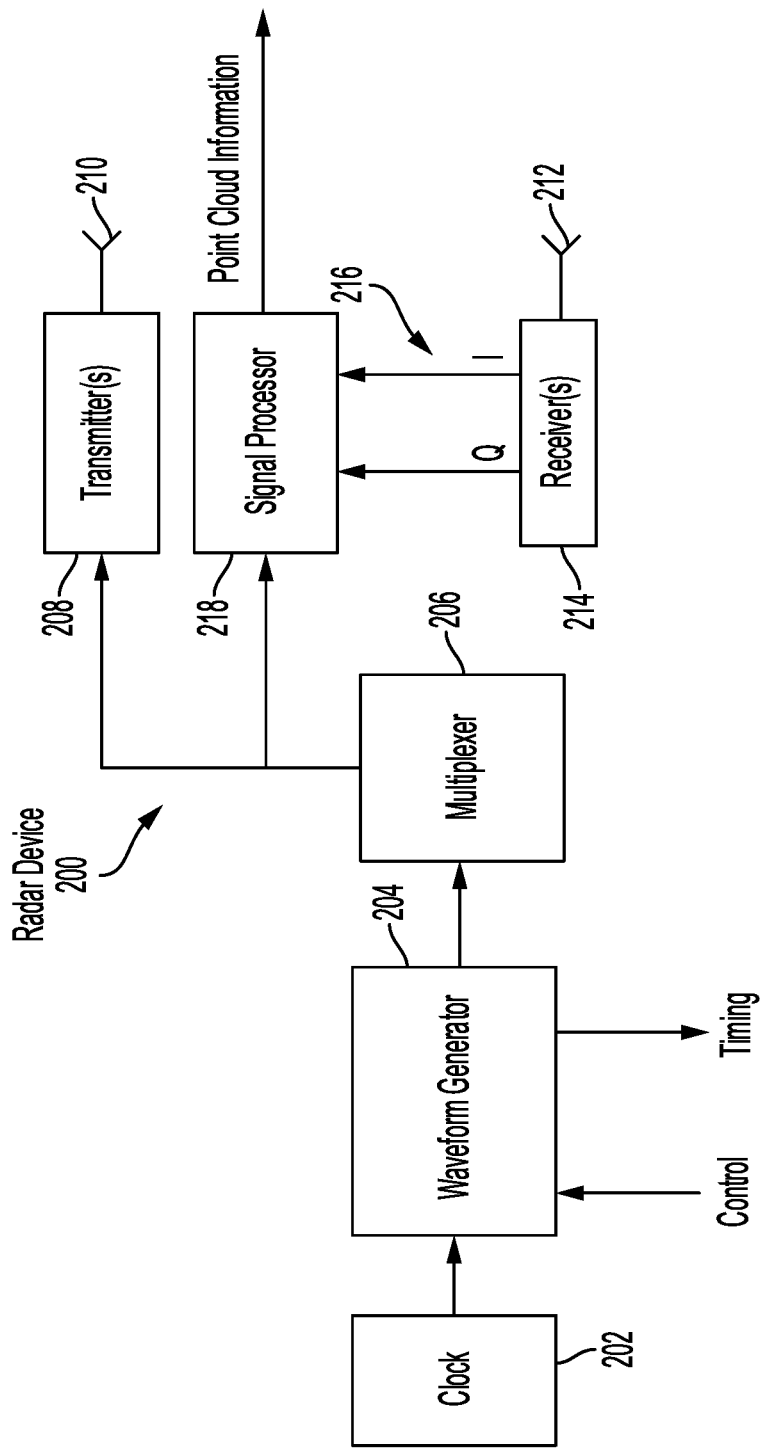
FIG. 2 provides an illustration of an illustrative radar device.

Referring now to FIG. 2, there is provided an illustration of an illustrative radar device 200. Radar devices 102, 104, 106 of FIG. 1 are the same as or similar to radar device 200. Thus, the following discussion of radar device 200 is sufficient for understanding radar devices 102, 104, 106.

As shown in FIG. 2, the radar device 200 comprises a clock 202 and a waveform generator 204. The waveform generator 204 is capable of producing a suitable waveform for range determination. The waveform can include, but is not limited to, a continuous-time signal. The radar device 200 also comprises a multiplexer 206, at least one transmitter 208, a signal processor 218, an antenna assembly (with transmitting element(s) 210 and receiving element(s) 212), and at least one receiver 214. The signal processor 130 is configured to generate point cloud information based on received signals.

During operations, the waveform generator 204 may generate a continuous-time signal. The continuous-time signal is emitted from the transmitting element 210 in a predetermined direction. The continuous-time signal may reflect off an object (e.g., object 150 of FIG. 1) back towards the radar device 200. The reflected continuous-time signal is received by the receiving element 212, and passed to the receiver 214. The received continuous-time signal provides information about the object's location and velocity. For example, if an object is moving either toward or away from the radar device 200, the received continuous-time signal will have a slightly different frequency than the frequency of the emitted continuous-time signal due to the Doppler effect. Accordingly, the receiver 214 processes the received continuous-time signal to convert the same to a discrete-time signal including a sequence of samples. Each sample of the sequence has I and Q components, and therefore is referred to herein as an IQ sample. The IQ samples are passed to the signal processor 218. The signal processor 218 uses the IQ samples to reconstruct/recover a signal, and generate point cloud information. The point cloud information includes, but is not limited to, a signal strength, a range value, a range-rate value, a range-rate angle value, a range-rate amplitude value, a velocity ambiguity, and/or a moduli value for each point in the cloud.

Figure 3:
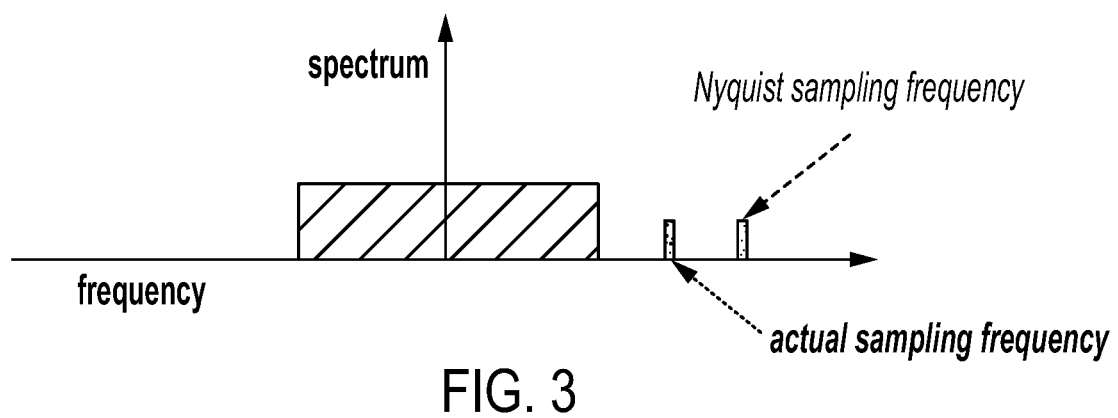
FIG. 3 provides a graph that is useful for understanding the present solution.

With reference to FIG. 3, the received continuous-time signal may have a frequency falling within $[-f_{max}, f_{max}]$. Based on sampling theory, the signal can be completely recovered by the IQ samples if the sampling frequency fs satisfies $fs \geq 2f_{max}$, where $2f_{max}$ is defined as the signal bandwidth. Aliasing occurs if $fs<2f_{max}$. The term "aliasing", as used here, refers to the distortion or artifact that results when a signal reconstructed from IQ samples is different from the original received continuous-time signal. The distortion or artifact results in a misidentification of the continuous-time signal's frequency or a determination of an incorrect frequency for the continuous-time signal. Any frequency higher than fs/2 is folded into $[-fs/2, fs/2]$. Mathematically, the truth frequency $f_{true}$ and its measured frequency $f_{measure}$ in samples are constrained by $f_{measure}=f_{true}+Kfs$, where K is an integer, and $[-fs/2 \leq f_{measure} < fs/2]$. In addition, since the range-rate can be uniquely mapped to the frequency via $f=2v/\lambda$ (where $\lambda$ is the wavelength), the frequency relationship can be converted into a range-rate domain in accordance with the following mathematical equation: $v_{measure}=v_{true}+KB$, where B represents the equivalent range-rate sampling width. The range-rate unwrapping refers to the interference of $v_{true}$ with the knowledge of $f_{measure}$ and B, but with K missing.

The received continuous-time signal may be undersampled in the range-rate domain. Thus, the dealiaser 110 of the radar system 100 implements de-aliasing operations so that the Doppler information can be used by the tracker 114 to accurately determine the object's location and velocity.

Figure 4:
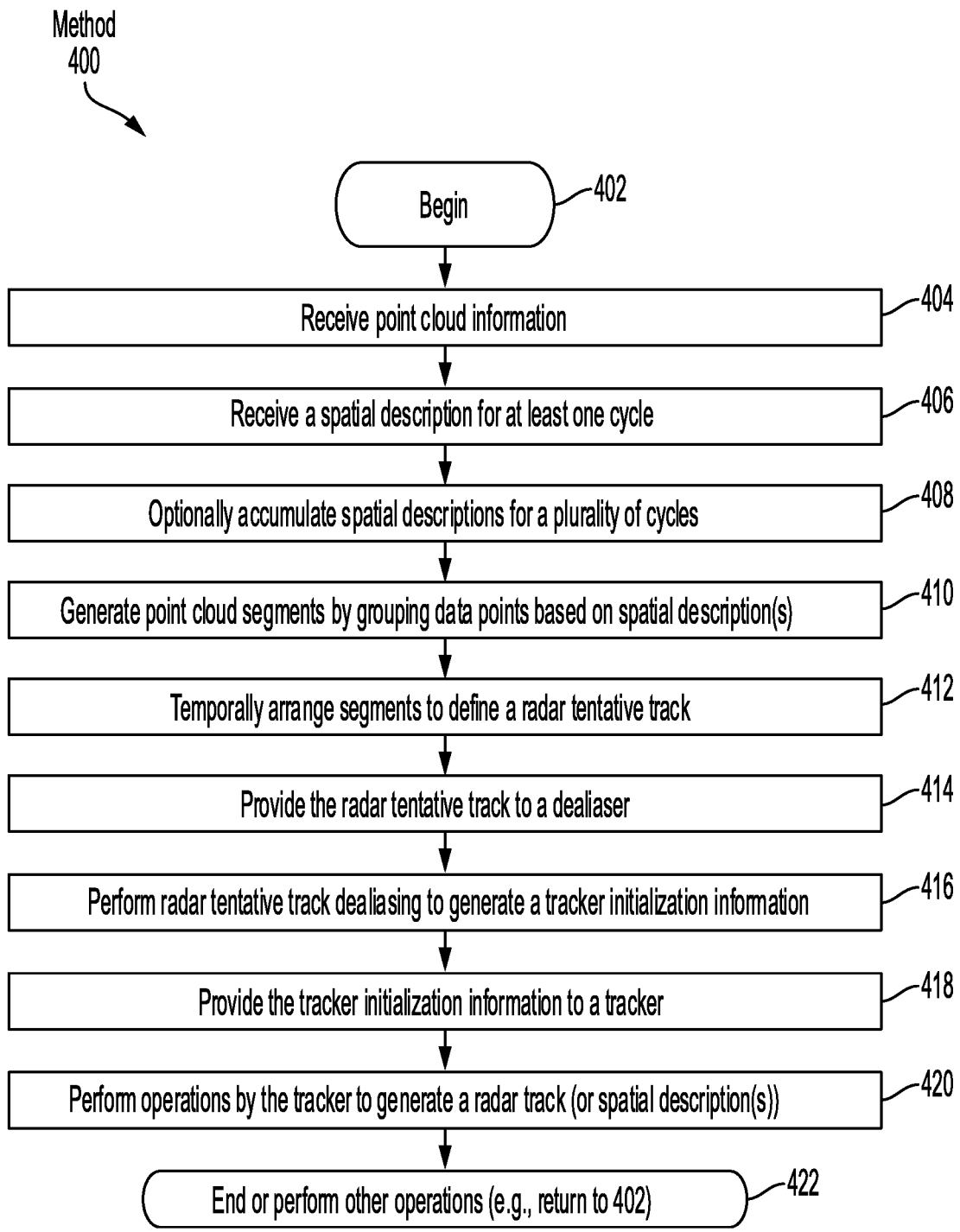
FIG. 4 provides a flow diagram for operating the radar system of FIG. 1.

Referring now to FIG. 4, there is provided an illustrative method 400 for operating a radar system (e.g., radar system 100 of FIG. 1). Method 400 begins with 402 and continues with 404 where point cloud information (e.g., point cloud information 108 of FIG. 1) is received by a data association module (e.g., data association module 130 of FIG. 1) from a plurality of radar devices (e.g., radar devices 102, 104, 106 of FIG. 1) during at least one cycle. The point cloud information defines a point cloud comprising a plurality of data points. The data association module can include, but is not limited to, a computing device (such as that described below in relation to FIG. 9).

In 406, the data association module receives a spatial description (e.g., track or spatial description 116 of FIG. 1) for at least one cycle from a tracker (e.g., tracker 114 of FIG. 1). In some scenarios, the data association module accumulates spatial descriptions for N cycles as shown by 408, where N is an integer. The accumulated spatial descriptions can include, but are not limited to, a spatial description for a cycle $c_1$, a spatial description for a cycle $c_2$, ..., and a spatial description for a cycle $c_N$. The tracker can include, but is not limited to, a computing device (such as that described below in relation to FIG. 9).

In 410, the data points of the point cloud are grouped together to form a plurality of point cloud data segments $S_n$. The grouping of data points is based on information contained in the spatial description(s). If a Euclidean distance between two data points is less than a first threshold value, then the two data points are assigned to or otherwise grouped together to at least partially form a point cloud data segment. The Euclidean distance is determined based on location information for the data points which is contained in the point cloud information. If an absolute difference between range-rate angles of two data points is less than a second threshold value, then the data points are assigned to or otherwise grouped together to at least partially form a point cloud data segment. The absolute difference in determined based on range-rate angles for the data points which are contained in the point cloud information. If a difference between range-rate amplitudes of two data points is less than a third threshold value, then the data points are assigned to or otherwise grouped together to at least partially form a point cloud data segment. This difference is determined based on range-rate amplitudes for the data points which are contained in the point cloud information.

The point cloud data segments $S_n$ are then temporally arranged or ordered in 412 to define a radar tentative track $T_{tentative}$ (i.e., point cloud segments arranged to have a temporal order). For example, the radar tentative track $T_{tentative}$ is defined as a sequence of point cloud data segments $S_1, S_2, \ldots, S_n$ including data points generated at different sequential times $t_1, t_2, \ldots, t_x$, i.e., $T_{tentative} = \{S_1, S_2, \ldots, S_n\}$, where $S_1$ includes data points generated at time $t_1$, $S_2$ includes data points generated at time $t_2$, ..., and $S_n$ includes data points generated at time $t_x$. The radar tentative track $T_{tentative}$ is then provided from the data association module 130 to a dealiaser (e.g., dealiaser 110 of FIG. 1) as part of residual information (e.g., residual information 132 of FIG. 1), as shown by 414. The dealiaser can include, but is not limited to, a computing device (such as that described below in relation to FIG. 9).

At the dealiaser, radar tentative track segment dealiasing is performed in 416 to generate tracker initialization information (e.g., tracker initialization information 112 of FIG. 1). The particulars of the radar tentative track segment dealiasing will become evident as the discussion progresses. The dealiasing produces results indicating whether the range-rate value(s) of the point cloud information need(s) to be modified. If the result indicates that the original range-rate value is correct (e.g., K=0), then the given range-rate value is not modified in the point cloud information. If a result indicates that a given range-rate value needs to be modified, then the range-rate value is changed based on the mathematical equation (1) provided below using a K value computed during the radar tentative track segment dealiasing. For example, point cloud information for a segment $S_n$ (including data points p1, p2, p3) is modified as shown below by the arrow.

p1: (signal strength=$s_1$, range=10, angle=11, range-rate=5.0 m/s, moduli=30)

p2: (signal strength=$s_2$, range=10.1, angle=11.1, range-rate=5.3 m/s, moduli=30)

p3: (signal strength=$s_3$, range=10.1, angle=11.1, range-rate=55.1 m/s→5.1 m/s, moduli=50)

The modified point cloud information constitutes tracker initialization information. The present solution is not limited to the particulars of this example.

The tracker initialization information is then passed to a tracker (e.g., tracker 114 of FIG. 1) in 418. Next in 420, operations are performed by the tracker to generate a track (or spatial description) (e.g., track or spatial description 116 of FIG. 1). Techniques for generating tracks (or spatial descriptions) from tracker initialization information are well known in the art. Any known or to be known technique can be used here. For example, a Kalman filter is used to generate tracks (or spatial descriptions). Subsequently, 422 is performed where method 400 ends or other operations are performed (e.g., return to 402).

Figure 6:
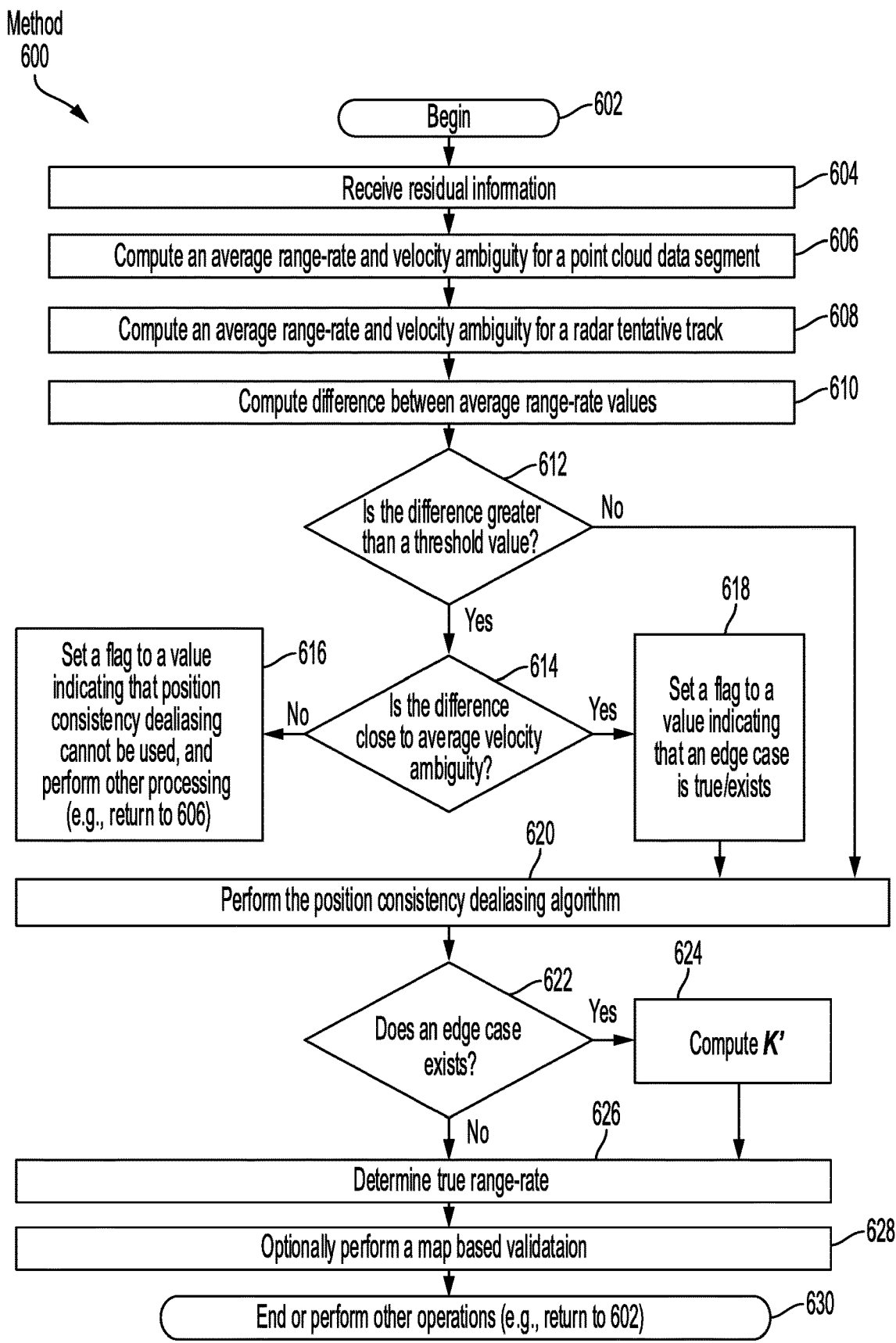
FIG. 6 provides a flow diagram of an illustrative method for radar tentative track segment dealiasing.

Referring now to FIG. 6, there is provided a flow diagram of an illustrative method 600 for radar tentative track segment dealiasing. Method 600 can be performed in 416 of FIG. 4. Method 600 is performed to determine a true range-rate $RR_{true}$ in accordance with the following mathematical equation (1).

$$RR_{measured} = RR_{true} + K*B \quad (1)$$

where B is the velocity ambiguity. Since K is unknown, the true range-rate $RR_{true}$ is inferred from measured range-rates and position information. For example, a measured range-rate $RR_{measured}$ for a data point is 5 ms at time $t_1$ (e.g., 1) and is 5 ms at time $t_2$ (e.g., 2). The position of the data point at time $t_1$ is defined by an x-coordinate=0 and a y-coordinate=100. The positon of the data point at time $t_2$ is defined by an x-coordinate=0 and a y-coordinate=135. The positon difference $P_{difference}$ is computed (e.g., 135−100=35). The position difference $P_{difference}$ is then converted to velocity v based on the following mathematical equation (2).

$$v = P_{difference} / t_{difference} \quad (2)$$

where $t_{difference}$ represents a difference between $t_2$ and $t_1$ (e.g., 2−1=1). In the present example, v=35/1=35. The inferred true range-rate $RR_{true}$ is approximated based on v and the angle α of the radar tentative track as shown by the following mathematical equation (3).

$$RR_{true} = approx(v, \alpha) \quad (3)$$

So in the present case, the inferred true range-rate $RR_{true}$ may be 35. The present solution is not limited to the particulars of this example.

As shown in FIG. 6, method 600 begins with 602 and continues with 604 where the dealiaser (e.g., dealiaser 110 of FIG. 1) receives residual information (e.g., residual information 132 of FIG. 1) from a data association module (e.g., data association module 130 of FIG. 1). The residual information includes, but is not limited to, point cloud information for data points of a point cloud, and a radar tentative track $T_{tentative}$ that is defined by a plurality of temporally arranged point cloud data segments $S_1, \ldots, S_n$ (each having a plurality of data points assigned thereto). The point cloud information for each data point includes, but is not limited to, a range-rate RR and a velocity ambiguity B.

The residual information is used in 606 by the dealiaser to compute an average rage-rate $RR_{average-S}$ and an average velocity ambiguity $B_{average-S}$ for a given point cloud data segment (e.g., segment $S_1$). These average values are computed using range-rate values and average velocity ambiguity values contained in the point cloud information and the radar tentative track. In 608, the dealiaser also computes an average range-rate $RR_{average-T}$ and an average velocity ambiguity $B_{average-T}$ for the radar tentative track $T_{tentative}$. The difference $DRR_{average}$ between the average range-rate values is computed in 610 and defined by the following mathematical equation (4).

$$DRR_{average} = RR_{average-T} - RR_{average-S} \qquad (4)$$

For example, if $RR_{average-T}=35$ and $RR_{average-S}=5.1$, then $DRR_{average}=35-5.1=29.9$. The present solution is not limited to the particulars of this example.

In 612, a determination is made as to whether the difference $DRR_{average}$ is greater than a threshold value thr. For example, if the difference $DRR_{average}=29.9$ and thr=1, then the difference is greater the threshold value. In contrast, if the difference $DRR_{average}=35-35.1=0.1$ and thr=1, then the difference is less than the threshold value. The present solution is not limited to the particulars of these examples.

If $DRR_{average}$ is less than or equal to thr [612:NO], then method 600 continues with 620. 620 will be described below.

If $DRR_{average}$ is greater than thr [612:YES], then 614 is performed where a decision is made as to whether the value of the difference $DRR_{average}$ is close to (e.g., ±1) the value (integer times K') of the average velocity ambiguity $B_{average-T}$ for the radar tentative track $T_{tentative}$. For example, if $RR_{average-T}=35$, $RR_{average-S}=5.1$ and $B_{average-T}=30$, then the difference is considered close to the average velocity ambiguity since the difference $DRR_{average}=35-5.1=29.9$ which is only 0.1 away from 30. The present solution is not limited to the particulars of this example.

If the value of the difference $DRR_{average}$ is not considered close to the value (integer times K') of the average velocity ambiguity $B_{average-T}$ [614:NO], then a flag is set in 616 to a value to indicate that position consistency dialiasing cannot be used for the given segment. Other processing may also be performed (e.g., method 600 may return to 606 and repeat the process for a next segment).

Figure 5:
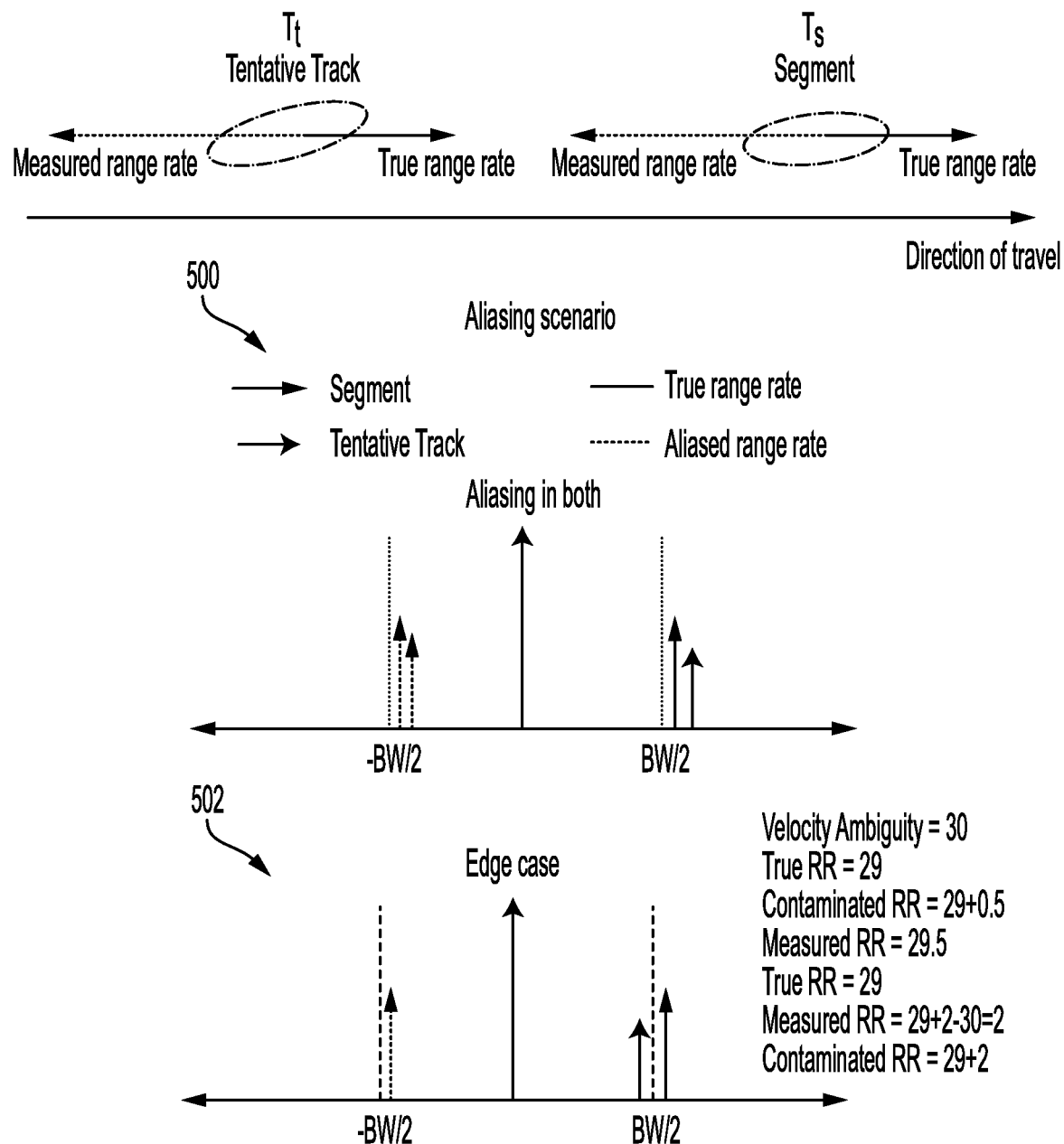
FIG. 5 provides graphs that are useful for understanding radar tentative track segment dealiasing.

If the value of the difference $DRR_{average}$ is considered close to the value (integer times K') of the average velocity ambiguity $B_{average-T}$ [614:YES], then a flag is set in 618 to indicate that an edge case is true. A graph 502 is provided in FIG. 5 which illustrates when an edge case is true or exists. The edge case is true or exists when (i) first values of a plurality of true range-rate values for a segment are greater than the velocity ambiguity by an amount less than a threshold amount (i.e., $B_{average-T} < RR_{True} < thr_1$), and (ii) second values of the plurality of true range-rate values are less than the velocity ambiguity by an amount greater than a threshold amount (i.e., $thr_2 < RR_{True} < B_{average-T}$), when the radar tentative track $T_{tentative}$ is a mixture of aliased and not aliased range-rate values.

Next, method 600 continues with 620 which involves performing a position consistency dealiasing algorithm by the dealiaser. The following discussion is provided to explain the position consistency dealiasing algorithm. Notably, the position consistency dealiasing algorithm uses the estimated range-rate from the positions. Hence, it does not matter if the tentative track or segment is aliased or not.

In some scenarios, a point cloud data segment $S_n$ has an average time of validity $TV_{average-s}$ and an average range-rate $RR_{average-S}$. The point cloud data segment Su is associated with a radar tentative track $T_{tentative}$. The radar tentative track $T_{tentative}$ has an average time validity $TV_{average-T}$ ($<TV_{average-s}$) and an average range-rate $RR_{average-T}$. Initially, it is not known if the range-rates $RR_{average-S}$ and $RR_{average-T}$ are aliased. Either one of the range-rates, both of the range-rates or none of the range-rates could be aliased. A graph 500 is provided in FIG. 5 which illustrates when both range-rates are aliased. Each of these cases are handled separately by the position consistency dealiasing algorithm.

The average translation of the segment/track detections in the vehicle frame at time $t_t$ for the radar tentative track $T_{tentative}$ is computed. Since the position consistency algorithm is used for far-range detections, the reported range-rates of the track detections are in the radial direction. Hence, the positions of the radar tentative track and given point cloud segment are transformed from the vehicle frame to a radial frame. The positions of the point cloud segment and radar tentative track in the radial frame are $P_s$ and $P_t$, respectively. Using the signed distance between $P_s$ and $P_t$, the average range-rate of these sets of detections is estimated in accordance with the following mathematical equation (5).

$$RR_{estimate} = (P_t - P_s)/(TV_{average-T} - TV_{average-S}) \qquad (5)$$

where $RR_{estimate}$ is an estimated average range-rate.

Different range-rate hypotheses are generated using the average range-rate for the radar tentative track and the average velocity ambiguity of the point cloud segments. Suppose a measured range-rate $RR_{measure}d$ for a given data point and a rational maximum speed over ground $v_g$ are provided, then possible K values are determined in accordance with the following mathematical equation (6).

$$|RR_{measured} + K*B_{average-S}| \leq v_g \qquad (6)$$

The possible K values are used to determine a plurality of different range-rate hypothesis values $RR_{hypothesis}$. K is an integer (positive, negative or zero). A range-rate hypothesis value $RR_{hypothesis}$ is determined in accordance with the following mathematical equation (7).

$$RR_{hypothesis} = RR_{average-T} + K*B_{average-S} \qquad (7)$$

A hypothesis is accepted if the resulting range-rate hypothesis value $RR_{hypothesis}$ is less than a pre-defined threshold.

Next, an absolute difference $\Delta R$ between the estimated range-rate and the hypothesis range-rate is determined. This absolute difference $\Delta R$ is defined by mathematical equation (8).

$$\Delta R = |RR_{estimate} - RR_{hypothesis}| \qquad (8)$$

The position consistency dealiasing algorithm is successful if the absolute difference $\Delta R$ is relatively small, e.g., close to zero or smaller than a threshold. The corresponding K would be the dealiasing factor.

Referring again to FIG. 6, method 600 continues with 622 when the position consistency dealiasing algorithm was successful. If the position consistency dealiasing algorithm is not successful, then method 600 ends or returns to 602. In 622, a determination is made as to whether a given flag has a value indicating that an edge case exists. If an edge case does not exist [622:NO], then 626 is performed where a true range-rate $RR_{true}$ is computing in accordance with the above-provided mathematical equation (1) using a K value computed in accordance with following mathematical equations (9) and (10).

$$v_{estamite} = P_{difference}/t_{difference} \quad (9)$$

$$K = \arg\min_K |v_{estamite} - RR_{measured} - K*B_{average-S}| \quad (10)$$

where $v_{estimate}$ is an estimated velocity of an object, and $P_{difference}$ is a difference between $P_s$ and $P_t$.

If an edge case does exist [622:YES], then 624 is performed where K' is computed in accordance with the following mathematical equation (11).

$$K' = \text{around}(RR_{average-T} - RR_{average-S})/B_{average}$$

which means around the int.

Once K and K' have been determined/computed, method 600 continues with 626 where a true range-rate $RR_{true}$ is determined. If a detection is made within a segment, then the true range-rate $RR_{true}$ is computed in accordance with the following mathematical equation (12).

$$RR_{true} = RR_{measured} + K*B_{detection} \quad (12)$$

If a detection is made in the tentative track, then the true range-rate $RR_{true}$ is computed in accordance with the following mathematical equation (13).

$$RR_{true} = RR_{measured} + (K+K')*B_{detection} \quad (13)$$

Notably, mathematical equation (13) considers the edge case, where the overall factors are different. Also, during the dealiasing process, the velocity ambiguity is used instead of the average velocity ambiguity as this computation should be precise. The true range-rate $RR_{true}$ constitutes tracker initialization information, which is provided to the tracker in 418 of FIG. 4.

In some scenarios, a map based validation is performed as shown by optional 628. A road map can be used in two ways to validate the true range-rate $RR_{true}$. First, a lane direction contained in the road map can be compared to the direction of the true range-rate $RR_{true}$. The results of this comparison indicates whether the range-rate is aliased. Lane speed limits contained in the road map can be compared to the range-rates of a given segment (which has been modified to include any modified range-rates). The results of this comparison could indicate whether there is aliasing. Dealiasing process is confirmed to be successful when the modified range-rate's direction is aligned with the lane direction. This validation feature can only be used if map information is accessible. Subsequently, 630 is performed where method 600 ends or other operations are performed (e.g., return to 602 so that another iteration is performed for a next point cloud data segment).

Illustrative Vehicle Based Systems

The above described radar system 100 can be used in a plurality of applications. Such applications include, but are not limited to, vehicle based applications. The following discussion is provided to illustrate how the radar system 100 of the present solution can be used to facilitate control of a vehicle (e.g., for collision avoidance and/or autonomous driving purposes). The vehicle can include, but is not limited to, an autonomous vehicle.

Figure 7:
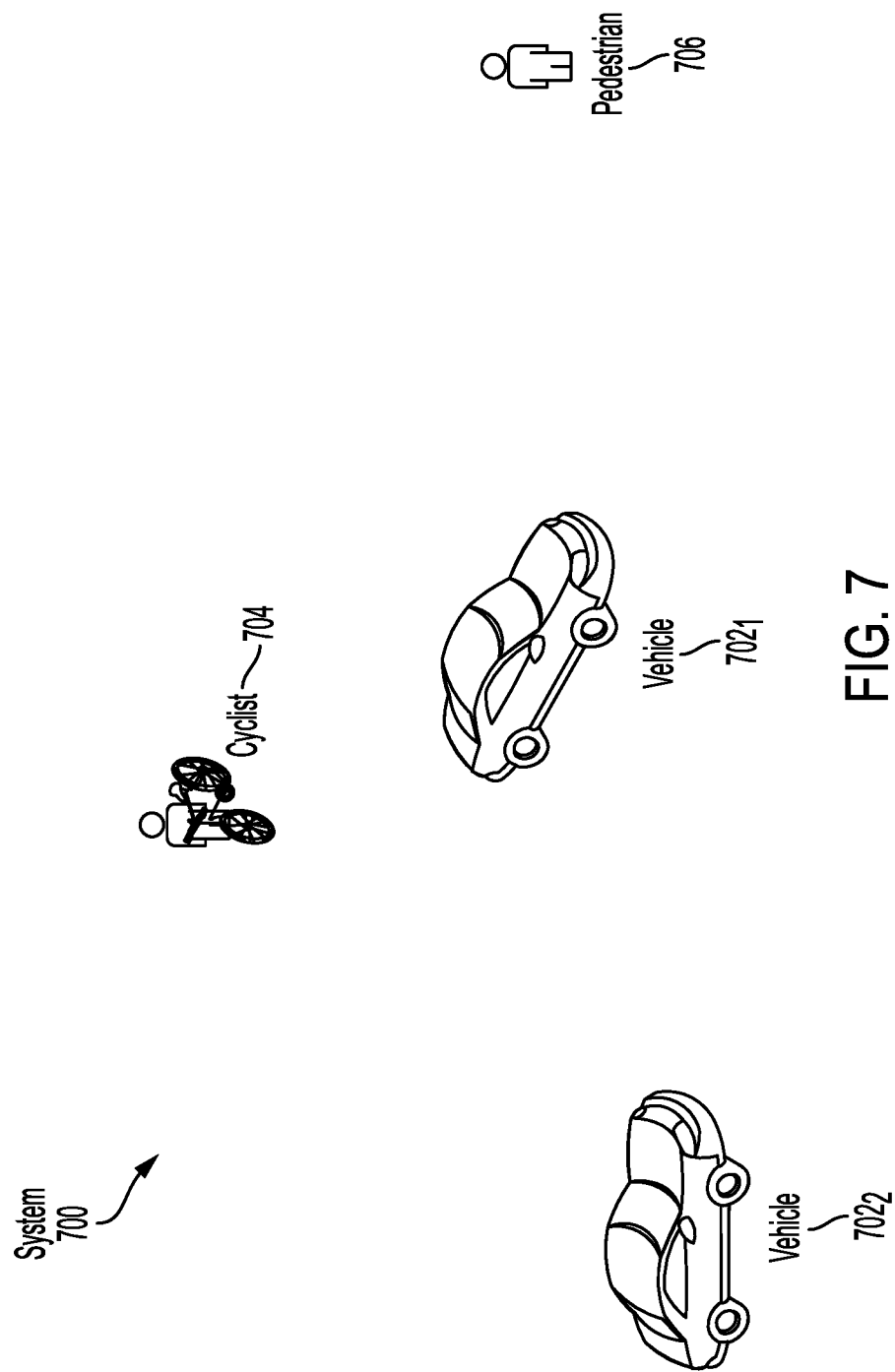
FIG. 7 provides an illustration of a system implementing the radar system described in relation to FIGS. 1-6.

Referring now to FIG. 7, there is provided an illustration of an illustrative system 700. System 700 comprises a vehicle $702_1$ that is traveling along a road in a semi-autonomous or autonomous manner. Vehicle $702_1$ is also referred to herein as an Autonomous Vehicle ("AV"). The AV $702_1$ can include, but is not limited to, a land vehicle (as shown in FIG. 7), an aircraft, or a watercraft.

AV $702_1$ is generally configured to detect objects $702_2$, 704, 706 in proximity thereto. The objects can include, but are not limited to, a vehicle $702_2$, cyclist 704 (such as a rider of a bicycle, electric scooter, motorcycle, or the like) and/or a pedestrian 706. When such a detection is made, AV $702_1$ performs operations to: generate one or more possible object trajectories for the detected object; and analyze at least one of the generated possible object trajectories to determine a vehicle trajectory for AV $702_1$. The AV $702_1$ is then caused to follow the vehicle trajectory.

Figure 8:
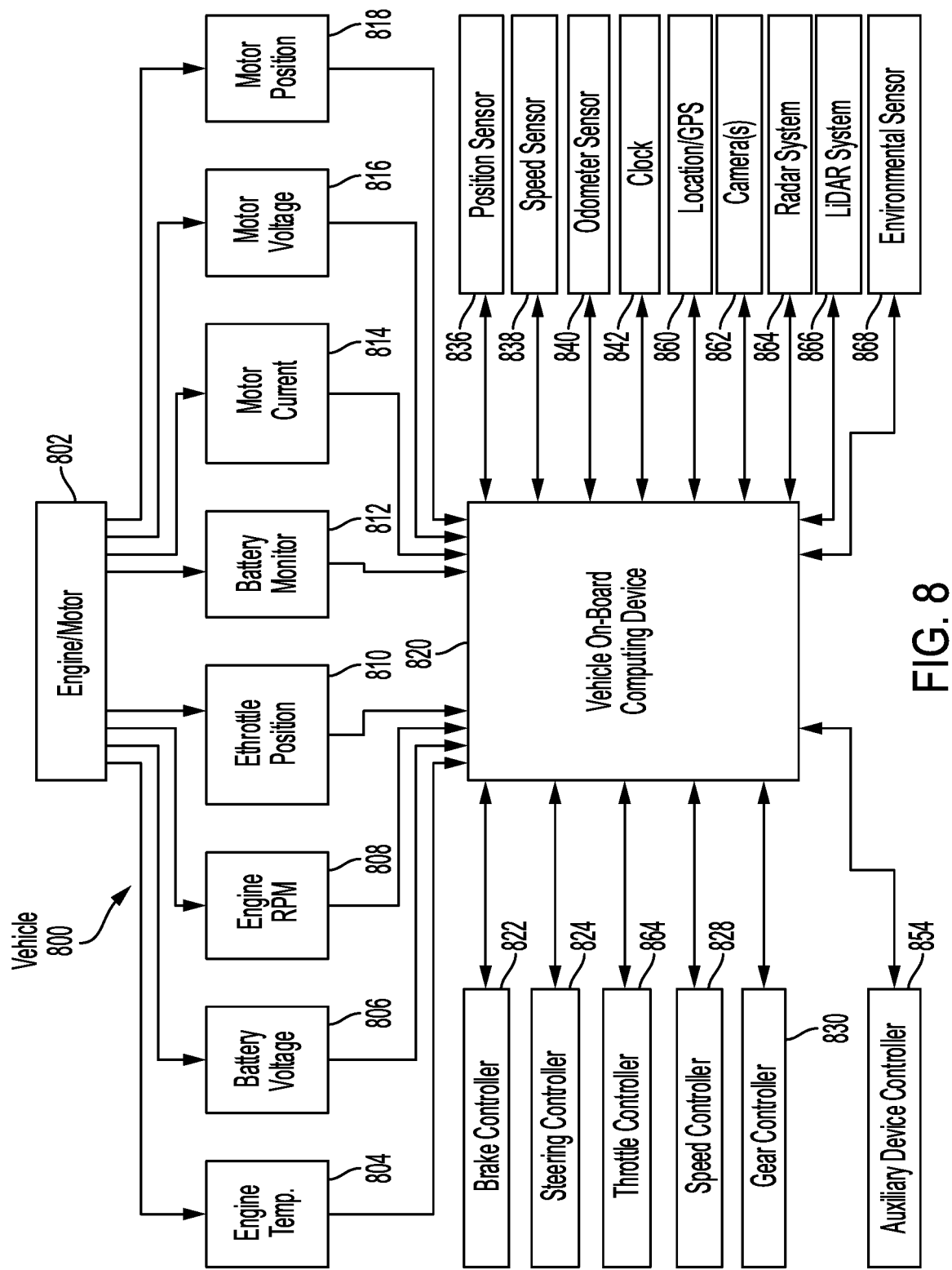
FIG. 8 is an illustration of an illustrative architecture for a vehicle.

Referring now to FIG. 8, there is provided an illustration of an illustrative system architecture 800 for a vehicle. Vehicles $702_1$ and/or $702_2$ of FIG. 7 can have the same or similar system architecture as that shown in FIG. 8. Thus, the following discussion of system architecture 800 is sufficient for understanding vehicle(s) $702_1$, $702_2$ of FIG. 7.

As shown in FIG. 8, the vehicle 800 includes an engine or motor 802 and various sensors 804-818 measuring various parameters of the vehicle. In gas-powered or hybrid vehicles having a fuel-powered engine, the sensors may include, for example, an engine temperature sensor 804, a battery voltage sensor 806, an engine rotations per minute (RPM) sensor 808, and a throttle position sensor 810. If the vehicle is an electric or hybrid vehicle, then the vehicle may have an electric motor, and accordingly will have sensors such as a battery monitoring system 812 (to measure current, voltage and/or temperature of the battery), motor current 814 and temperature 816 sensors, and motor position sensors such as resolvers and encoders 818.

Operational parameter sensors that are common to both types of vehicles include, for example: a position sensor 836 such as an accelerometer, gyroscope and/or inertial measurement unit; a speed sensor 838; and an odometer sensor 840. The vehicle also may have a clock 842 that the system uses to determine vehicle time during operation. The clock 842 may be encoded into the vehicle on-board computing device, it may be a separate device, or multiple clocks may be available.

The vehicle also will include various sensors that operate to gather information about the environment in which the vehicle is traveling. These sensors may include, for example: a location sensor 860 (e.g., a Global Positioning System (GPS) device); object detection sensors such as one or more cameras 862; a LiDAR sensor system 866; and/or a radar system 864. Radar system 864 is the same as or similar to radar system 100 discussed above in relation to FIGS. 1-7. As such, the above discussion of radar system 864 is sufficient for understanding radar system 864. The sensors also may include environmental sensors 868 such as a precipitation sensor and/or ambient temperature sensor. The object detection sensors may enable the vehicle on-board computing device 820 to detect objects that are within a given distance range of the vehicle 800 in any direction, while the environmental sensors collect data about environmental conditions within the vehicle's area of travel.

During operations, information is communicated from the sensors to the on-board computing device 820. The on-board computing device 820 analyzes the data captured by the sensors, and optionally controls operations of the vehicle based on results of the analysis. For example, the on-board computing device 820 may control: braking via a brake controller 822; direction via a steering controller 824; speed and acceleration via a throttle controller 826 (in a gas-powered vehicle) or motor speed controller 828 (such as a current level controller in an electric vehicle); a differential gear controller 830 (in vehicles with transmissions); and/or other controllers.

Geographic location information may be communicated from the location sensor 860 to the on-board computing device 820, which may then access a map of the environment that corresponds to the location information to determine known fixed features of the environment such as streets, buildings, stop signs and/or stop/go signals. Captured images from the camera(s) 862 and/or object detection information captured from sensors such as LiDAR is communicated to the on-board computing device 820. The object detection information and/or captured images are processed by the on-board computing device 820 to detect objects in proximity to the vehicle 800. Any known or to be known technique for making an object detection based on sensor data and/or captured images can be used in the embodiments disclosed in this document.

When such an object detection is made, the on-board computing device 820 performs operations to: generate one or more possible object trajectories for the detected object; and analyze at least one of the generated possible object trajectories to determine if there is a risk of a collision in a threshold period of time (e.g., 1 minute). If so, the on-board computing device 820 performs operations to determine whether the collision can be avoided if a given vehicle trajectory is followed by the vehicle 800 and any one of a plurality of dynamically generated emergency maneuvers is performed in a pre-defined time period (e.g., N milliseconds). If the collision can be avoided, then the on-board computing device 820 takes no action to change the vehicle trajectory or optionally causes the vehicle 800 to perform a cautious maneuver (e.g., mildly slows down). In contrast, if the collision cannot be avoided, then the on-board computing device 820 causes the vehicle 800 to immediately take an emergency maneuver (e.g., brakes and/or changes direction of travel).

Figure 9:
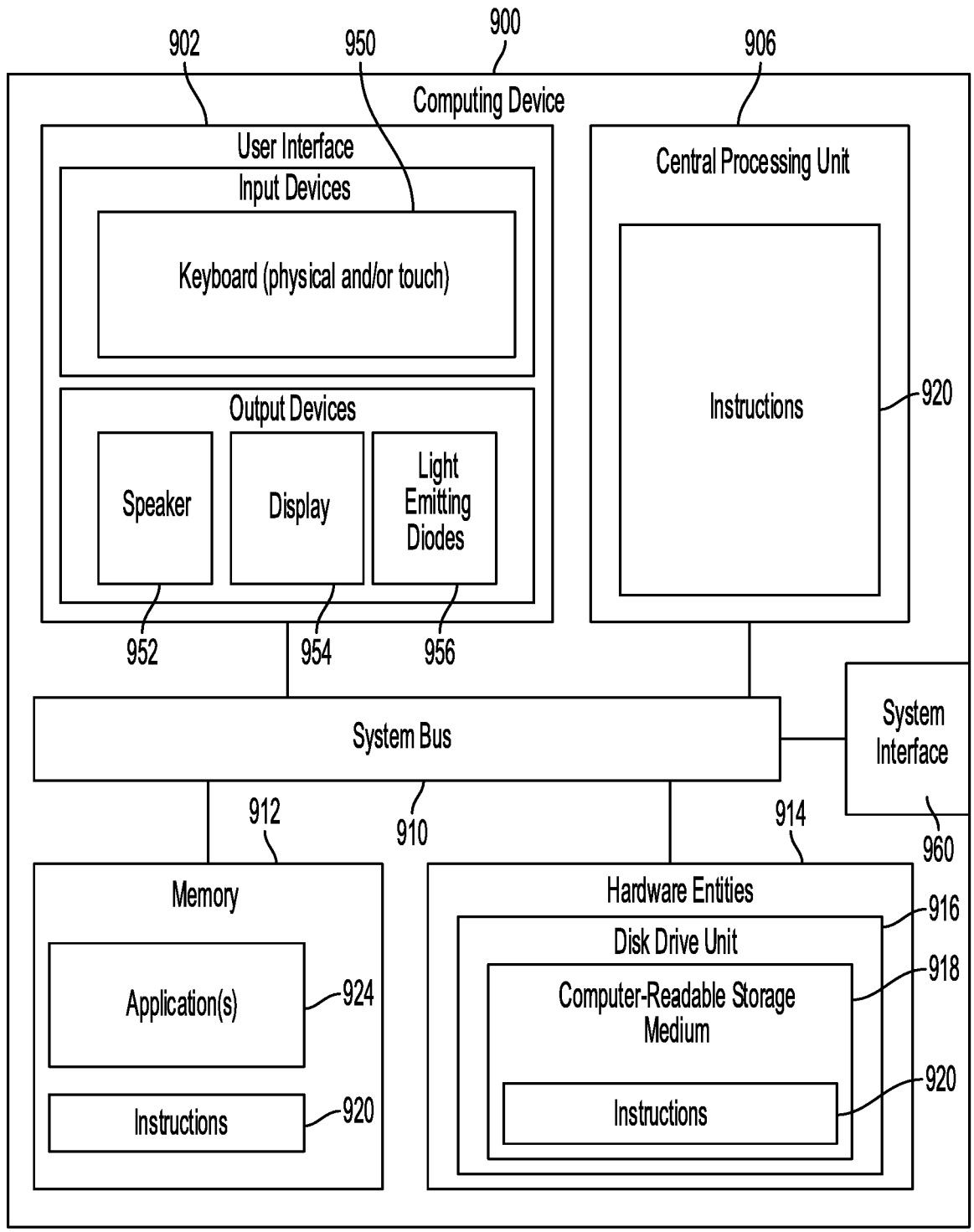
FIG. 9 is an illustration of an illustrative computing device.

Referring now to FIG. 9, there is provided an illustration of an illustrative architecture for a computing device 900. The data association module 130 of FIG. 1, dealiaser 110 of FIG. 1, tracker 114 of FIG. 1, radar system 864 of FIG. 8 and/or vehicle on-board computing device 820 of FIG. 8 is at least partially the same as or similar to computing device 900. As such, the discussion of computing device 900 is sufficient for understanding the data association module 130 of FIG. 1, dealiaser 110 of FIG. 1, tracker 114 of FIG. 1, radar system 864 of FIG. 8 and/or vehicle on-board computing device 820 of FIG. 8.

Computing device 900 may include more or less components than those shown in FIG. 9. However, the components shown are sufficient to disclose an illustrative solution implementing the present solution. The hardware architecture of FIG. 9 represents one implementation of a representative computing device configured to operate a vehicle, as described herein. As such, the computing device 900 of FIG. 9 implements at least a portion of the method(s) described herein.

Some or all components of the computing device 900 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 9, the computing device 900 comprises a user interface 902, a Central Processing Unit ("CPU") 906, a system bus 910, a memory 912 connected to and accessible by other portions of computing device 900 through system bus 910, a system interface 960, and hardware entities 914 connected to system bus 910. The user interface can include input devices and output devices, which facilitate user-software interactions for controlling operations of the computing device 900. The input devices include, but are not limited to, a physical and/or touch keyboard 950. The input devices can be connected to the computing device 900 via a wired or wireless connection (e.g., a Bluetooth® connection). The output devices include, but are not limited to, a speaker 952, a display 954, and/or light emitting diodes 956. System interface 960 is configured to facilitate wired or wireless communications to and from external devices (e.g., network nodes such as access points, etc.).

At least some of the hardware entities 914 perform actions involving access to and use of memory 912, which can be a Random Access Memory ("RAM"), a disk drive, flash memory, a Compact Disc Read Only Memory ("CD-ROM") and/or another hardware device that is capable of storing instructions and data. Hardware entities 914 can include a disk drive unit 916 comprising a computer-readable storage medium 918 on which is stored one or more sets of instructions 920 (e.g., software code) configured to implement one or more of the methodologies, procedures, or functions described herein. The instructions 920 can also reside, completely or at least partially, within the memory 912 and/or within the CPU 906 during execution thereof by the computing device 900. The memory 912 and the CPU 906 also can constitute machine-readable media. The term "machine-readable media", as used here, refers to a single medium or multiple media (e.g., a centralized or distributed database, and/or associated caches and servers) that store the one or more sets of instructions 920. The term "machine-readable media", as used here, also refers to any medium that is capable of storing, encoding or carrying a set of instructions 920 for execution by the computing device 900 and that cause the computing device 900 to perform any one or more of the methodologies of the present disclosure.

Figure 10:
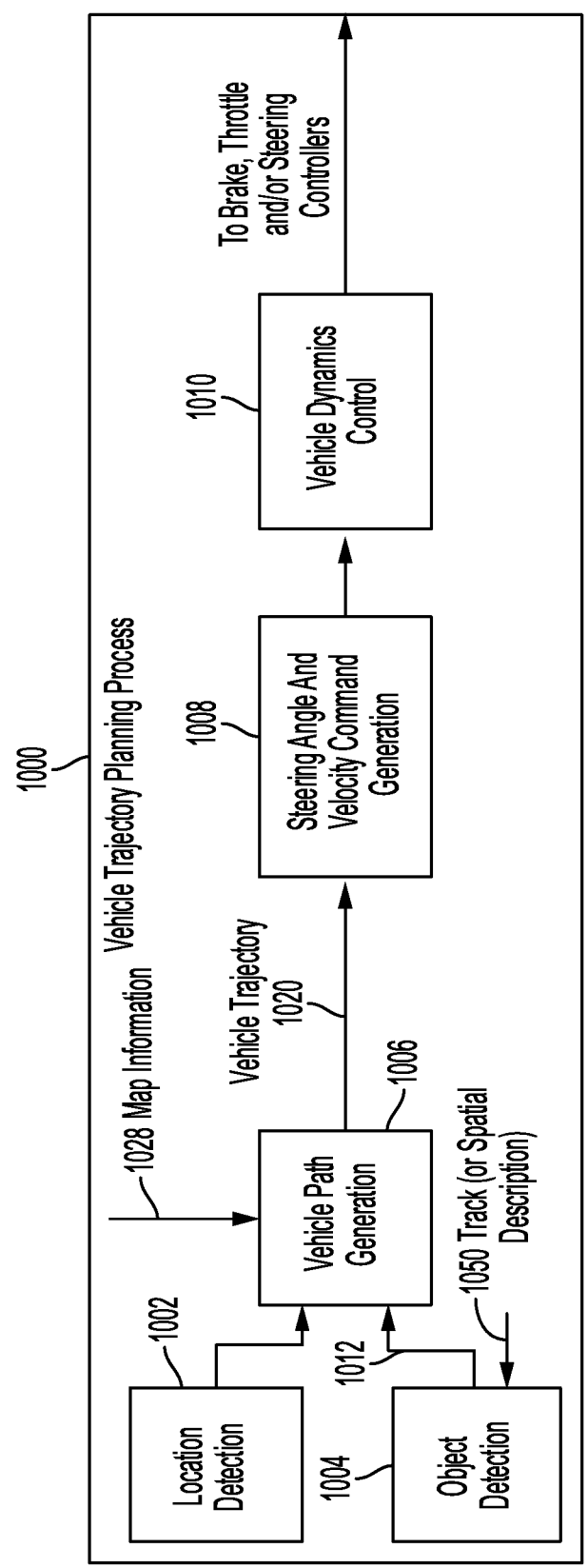
FIG. 10 provides a block diagram that is useful for understanding how control of a vehicle is achieved in accordance with the present solution.

Referring now to FIG. 10, there is provided a block diagram that is useful for understanding how vehicle control is achieved in accordance with the present solution. All of the operations performed in blocks 1002-1010 can be performed by the on-board computing device (e.g., vehicle on-board computing device 820 of FIG. 8) of a vehicle (e.g., AV 702$_1$ of FIG. 7).

In block 1002, a location of the vehicle is detected. This detection can be made based on sensor data output from a location sensor (e.g., location sensor 860 of FIG. 8) of the vehicle. This sensor data can include, but is not limited to, Global Positioning System ("GPS") data. The detected location of the vehicle is then passed to block 1006.

In block 1004, an object is detected within proximity of the vehicle. This detection is made based on sensor data output from a radar system (e.g., radar system 100 of FIG. 1, and/or radar system 864 of FIG. 8), a LiDAR system (e.g., a LiDAR system 866 of FIG. 8) and/or a camera (e.g., camera 862 of FIG. 8) of the vehicle. The sensor data output from the radar system includes, but is not limited to, a track (or spatial description) 1050 for the object. The track (or spatial description) 1050 is the same as or similar to track (or spatial description) 116 of FIG. 1. The sensor data is also used to determine one or more possible object trajectories for the detected object. The possible object trajectories can include, but are not limited to, the following trajectories:
- a trajectory defined by the object's actual speed (e.g., 1 mile per hour) and actual direction of travel (e.g., west);
- a trajectory defined by the object's actual speed (e.g., 1 mile per hour) and another possible direction of travel (e.g., south, south-west, or X (e.g., 40°) degrees from the object's actual direction of travel in a direction towards the AV) for the object;
- a trajectory defined by another possible speed for the object (e.g., 2-10 miles per hour) and the object's actual direction of travel (e.g., west); and/or
- a trajectory defined by another possible speed for the object (e.g., 2-10 miles per hour) and another possible direction of travel (e.g., south, south-west, or X (e.g., 40°) degrees from the object's actual direction of travel in a direction towards the AV) for the object.

The one or more possible object trajectories 1012 is(are) then passed to block 1006.

In block 1006, a vehicle trajectory 1020 is generated using the information from blocks 1002 and 1004. Techniques for determining a vehicle trajectory are well known in the art, and therefore will not be described herein. Any known or to be known technique for determining a vehicle trajectory can be used herein without limitation. In some scenarios, the vehicle trajectory 1020 is determined based on the location information from block 1002, the object detection/trajectory information from block 1004, and map information 1028 (which is pre-stored in a data store of the vehicle). The vehicle trajectory 1020 represents a smooth path that does not have abrupt changes that would otherwise provide passenger discomfort. The vehicle trajectory 1020 is then provided to block 1008.

In block 1008, a steering angle and velocity command is generated based on the vehicle trajectory 1020. The steering angle and velocity command is provided to block 1010 for vehicle dynamics control. The vehicle dynamics control cause the vehicle to decelerate, cause the vehicle to accelerate, and/or cause the vehicle to change its direction of travel.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for operating a radar system, comprising, by a processor:
    receiving first point cloud information generated by a first radar device, second point cloud information from a second radar device, and a spatial description for an object that was detected by the radar system, the first and second radar devices having different locations in the radar system;
    generating a plurality of point cloud segments by grouping data points of the first point cloud information and data points of the second point cloud information based on the spatial description;
    arranging the point cloud segments in a temporal order to define a radar tentative track;
    performing dealiasing operations using the radar tentative track to generate tracker initialization information, where the dealiasing operations use, as inputs to a dealiasing algorithm, an average range-rate value and an average velocity ambiguity value for each said point cloud segment and said radar tentative track; and
    using the tracker initialization information to generate a track for the object.

2. The method according to claim 1, wherein two data points are grouped together to form a point cloud segment of the plurality of point cloud segments when a Euclidean distance between the two data points is less than a threshold value.

3. The method according to claim 1, wherein two data points are grouped together to form a point cloud segment of the plurality of point cloud segments when an absolute difference between range-rate angles of the two data points is less than a threshold value.

4. The method according to claim 1, wherein two data points are grouped together to form a point cloud segment of the plurality of point cloud segments when a difference between range-rate amplitudes of the two data points is less than a threshold value.

5. The method according to claim 1, wherein the dealiasing operations further comprise:
    computing a range-rate difference value between the average range-rate value for a given point cloud segment and the average range-rate value for the radar tentative track; and
    comparing the range-rate difference value to a threshold value.

6. The method according to claim 5, wherein the dealiasing operations further comprise determining that the range-rate difference value is close to the average velocity ambiguity for the radar tentative track when the range-rate difference is greater than the threshold value.

7. The method according to claim 6, wherein the dealiasing operations further comprise determining that an edge case exists when a determination is made that the range-rate difference value is close to the average velocity ambiguity for the radar tentative track.

8. The method according to claim 1, wherein the dealiasing operations comprise performing a position consistency dealiasing algorithm.

9. The method according to claim 8, wherein the position consistency dealiasing algorithm comprises estimating an average range-rate in accordance with mathematical equation $$RR_{estimate} = (P_t - P_s)/(TV_{average-T} - TV_{average-S})$$

where $RR_{estimate}$ is an estimated average range-rate, $P_t$ is a position of the radar tentative track, $P_s$ is a position of a given point cloud segment, $TV_{average-T}$ is an average time of validity for the radar tentative track, and $TV_{average-S}$ is an average time of validity for the given point cloud segment.

10. The method according to claim 9, wherein the position consistency dealiasing algorithm further comprises determining a plurality of possible K values in accordance with mathematical equation $$|RR_{measured} + K*B_{average-S}| \leq v_g$$

where $RR_{measured}$ is a measured range rate for a given data point, $B_{average-S}$ is an average velocity ambiguity for a given point cloud segment, and $v_g$ is a rational maximum speed over ground.

11. The method according to claim 10, wherein the position consistency dealiasing algorithm further comprises generating a plurality of range-rate hypotheses values in accordance with mathematical equation $$RR_{hypothesis} = RR_{average\text{-}T} + K*B_{average\text{-}S}$$

where $RR_{hypothesis}$ is a range-rate hypotheses value, and $RR_{average\text{-}T}$ is an average range-rate for the radar tentative track.

12. The method according to claim 11, wherein the position consistency dealiasing algorithm further comprises accepting a hypothesis when a respective one of the plurality of range-rate hypotheses values is less than a pre-defined threshold.

13. The method according to claim 12, wherein the position consistency dealiasing algorithm further comprises determining an absolute difference between the estimated average range-rate and a given range-rate hypothesis value of the plurality of range-rate hypotheses values.

14. The method according to claim 13, wherein the position consistency dealiasing algorithm is considered successful when the absolute difference between an estimated range-rate and a hypothesis range-rate is greater than a threshold.

15. The method according to claim 14, wherein the dealiasing operations further comprise determining a true range-rate value when the position consistency dealiasing algorithm is considered successful.

16. The method according to claim 15, wherein the dealiasing operations further comprise using the true range-rate to generate the tracker initialization information.

17. A system, comprising:
a processor; and
a non-transitory computer-readable storage medium comprising programming instructions that are configured to cause the processor to implement a method for operating a radar system, wherein the programming instructions comprise instructions to:
receive first point cloud information generated by a first radar device, second point cloud information from a second radar device, and a spatial description for an object that was detected by the radar system, the first and second radar devices having different locations in the radar system;
generate a plurality of point cloud segments by grouping data points of the first point cloud information and data points of the second point cloud information based on the spatial description;
arrange the point cloud segments in a temporal order to define a radar tentative track;
perform dealiasing operations using the radar tentative track to generate tracker initialization information, where the dealiasing operations use, as inputs to a dealiasing algorithm, an average range-rate value and an average velocity ambiguity value for each said point cloud segment and said radar tentative track; and
use the tracker initialization information to generate a track for the object.

18. The system according to claim 17, wherein two data points are grouped together to form a point cloud segment of the plurality of point cloud segments when a Euclidean distance between the two data points is less than a threshold value.

19. The system according to claim 17, wherein two data points are grouped together to form a point cloud segment of the plurality of point cloud segments when an absolute difference between range-rate angles of the two data points is less than a threshold value.

20. The system according to claim 17, wherein two data points are grouped together to form a point cloud segment of the plurality of point cloud segments when a difference between range-rate amplitudes of the two data points is less than a threshold value.

21. The system according to claim 17, wherein the dealiasing operations further comprise:
computing a range-rate difference value between the average range-rate value for a given point cloud segment and the average range-rate value for the radar tentative track; and
comparing the range-rate difference value to a threshold value.

22. The system according to claim 21, wherein the dealiasing operations further comprise determining that the range-rate difference value is close to the average velocity ambiguity for the radar tentative track when the range-rate difference is greater than the threshold value.

23. The system according to claim 22, wherein the dealiasing operations further comprise determining that an edge case exists when a determination is made that the range-rate difference value is close to the average velocity ambiguity for the radar tentative track.

24. The system according to claim 17, wherein the dealiasing operations comprise performing a position consistency dealiasing algorithm.

25. The system according to claim 24, wherein the position consistency dealiasing algorithm comprises estimating an average range-rate in accordance with mathematical equation $$RR_{estimate} = (P_t - P_s)/(TV_{average\text{-}T} - TV_{average\text{-}S})$$

where $RR_{estimate}$ is an estimated average range-rate, $P_t$ is a position of the radar tentative track, $P_s$ is a position of a given point cloud segment, $TV_{average\text{-}T}$ is an average time of validity for the radar tentative track, and $TV_{average\text{-}S}$ is an average time of validity for the given point cloud segment.

26. The system according to claim 25, wherein the position consistency dealiasing algorithm further comprises determining a plurality of possible K values in accordance with mathematical equation $$|RR_{measured} + K*B_{average\text{-}S}| \leq v_g$$

where $RR_{measured}$ is a measured range rate for a given data point, $B_{average\text{-}S}$ is an average velocity ambiguity for a given point cloud segment, and $v_g$ is a rational maximum speed over ground.

27. The system according to claim 26, wherein the position consistency dealiasing algorithm further comprises generating a plurality of range-rate hypotheses values in accordance with mathematical equation $$RR_{hypothesis} = RR_{average\text{-}T} + K*B_{average\text{-}S}$$

where $RR_{hypothesis}$ is a range-rate hypotheses value, and $RR_{average\text{-}T}$ is an average range-rate for the radar tentative track.

28. The system according to claim 27, wherein the position consistency dealiasing algorithm further comprises accepting a hypothesis when a respective one of the plurality of range-rate hypotheses values is less than a pre-defined threshold.

29. The system according to claim 28, wherein the position consistency dealiasing algorithm further comprises determining an absolute difference between the estimated average range-rate and a given range-rate hypothesis value of the plurality of range-rate hypotheses values.

30. The system according to claim 29, wherein the position consistency dealiasing algorithm is considered successful when the absolute difference between an estimated range-rate and a hypothesis range-rate is greater than a threshold.

31. The system according to claim 30, wherein the dialiasing operations further comprise determining a true range-rate value when the position consistency dealiasing algorithm is considered successful.

32. The system according to claim 31, wherein the dialiasing operations further comprise using the true range-rate to generate the tracker initialization information.

33. A non-transitory computer-readable medium that stores instructions that are configured to, when executed by at least one computing device, cause the at least one computing device to perform operations comprising:

receiving first point cloud information generated by a first radar device, second point cloud information from a second radar device, and a spatial description for an object that was detected by the radar system, the first and second radar devices having different locations in the radar system;

generating a plurality of point cloud segments by grouping data points of the first point cloud information and data points of the second point cloud information based on the spatial description;

arranging the point cloud segments in a temporal order to define a radar tentative track;

performing dealiasing operations using the radar tentative track to generate tracker initialization information, where the dealiasing operations use, as inputs to a dealiasing algorithm, an average range-rate value and an average velocity ambiguity value for each said point cloud segment and said radar tentative track; and using the tracker initialization information to generate a track for the object.

* * * * *